(12) United States Patent
Hiramoto et al.

(10) Patent No.: US 7,842,327 B2
(45) Date of Patent: Nov. 30, 2010

(54) FRESH TEA LEAF POWDER AND PROCESSED PRODUCT, EXTRACT, OIL AND AROMA OBTAINED FROM FRESH TEA LEAF POWDER

(75) Inventors: Tadahiro Hiramoto, Kanagawa (JP); Kenji Saiki, Kanagawa (JP); Satoshi Masumura, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 858 days.

(21) Appl. No.: 10/558,388

(22) PCT Filed: Oct. 22, 2004

(86) PCT No.: PCT/JP2004/016064

§ 371 (c)(1),
(2), (4) Date: Nov. 29, 2005

(87) PCT Pub. No.: WO2005/039301

PCT Pub. Date: May 6, 2005

(65) Prior Publication Data

US 2007/0009640 A1    Jan. 11, 2007

(30) Foreign Application Priority Data

Oct. 23, 2003    (JP) ............... 2003-363462

(51) Int. Cl.
    *A23F 3/00*    (2006.01)
(52) U.S. Cl. ............. 426/597; 426/590; 426/595; 426/384; 426/330.3; 426/96; 426/443
(58) Field of Classification Search .......... None
    See application file for complete search history.

(56) References Cited

U.S. PATENT DOCUMENTS

| 2,927,860 | A | * | 3/1960 | Seltzer et al. ............ 426/387 |
| 3,438,785 | A | * | 4/1969 | Wolfgang et al. ........... 426/49 |
| 3,911,145 | A | * | 10/1975 | Marion ................. 426/597 |
| 4,357,361 | A | * | 11/1982 | Lunder et al. ............ 426/597 |
| 4,732,773 | A | * | 3/1988 | Schott ................. 426/590 |
| 4,851,252 | A | * | 7/1989 | Greither et al. ........... 426/599 |
| 4,935,256 | A | * | 6/1990 | Tsai ................. 426/330.3 |
| 5,306,486 | A | * | 4/1994 | McCook et al. ........... 424/59 |
| H001628 | H | * | 1/1997 | Ekanayake et al. ......... 426/597 |
| 5,993,867 | A | * | 11/1999 | Rohdewald ............... 426/96 |
| 6,096,365 | A | * | 8/2000 | Spisak et al. ............ 426/597 |
| 6,416,807 | B1 | * | 7/2002 | Yamamoto .............. 426/597 |

FOREIGN PATENT DOCUMENTS

| CN | 1217886 | | 6/1999 |
| JP | 59-95846 | A | 6/1984 |
| JP | 60-78543 | A | 4/1985 |
| JP | 63-12250 | A | 1/1988 |
| JP | 63-169933 | A | 7/1988 |
| JP | 1-269452 | A | 10/1989 |
| JP | 4-52490 | U | 5/1992 |
| JP | 6-141775 | | 5/1994 |
| JP | 11-510473 | A | 9/1999 |
| JP | 11-346702 | A | 12/1999 |
| JP | 2001-286260 | | 10/2001 |
| JP | 2002-171905 | A | 6/2002 |
| JP | 2003-135000 | A | 5/2003 |
| JP | 2003-144049 | A | 5/2003 |
| JP | 2003-153651 | A | 5/2003 |

OTHER PUBLICATIONS

Pintauro, Nicholas D., Tea and Soluble Tea Products Manufacture, 1977, Noyes Data Corporation, New Jersey, 14-15.*
Office Action mailed in Chinese Application No. 200480014570.0 corresponding to the instant U.S. application (English translation included).
Indian Office Action issued in corresponding Indian application No. 5432/DELNP/2005 on Dec. 30, 2009.

* cited by examiner

*Primary Examiner*—Jennifer C McNeil
*Assistant Examiner*—Hong Mehta
(74) *Attorney, Agent, or Firm*—Sughrue Mion, PLLC

(57) ABSTRACT

It is intended to disclose a fresh tea leaf powder which is obtainable by collecting a fresh leaf and/or a stem of tea plant (scientific name *Camellia sinensis*), followed by freeze-drying and subsequent milling the same; a processed and treated tea leaf, a treated vegetable, a treated fruit or a treated flower obtained by treating a tea leave, a vegetable, a fruit or a flower with the above-described fresh tea leaf powder; a tea extract, a vegetable extract, a fruit extract (fruit juice) or a flower extract (oil) prepared from the above-described processed and treated tea leaf, treated vegetable, treated fruit or treated flower; and tea aroma, vegetable aroma, fruit aroma or flower aroma obtained from the above-described tea extract, vegetable extract, fruit extract or flower extract by the process of collecting aroma compounds.

16 Claims, 1 Drawing Sheet

FRESH TEA LEAF POWDER AND PROCESSED PRODUCT, EXTRACT, OIL AND AROMA OBTAINED FROM FRESH TEA LEAF POWDER

This application claims the benefit of PCT International Application Number PCT/JP2004/016064, filed Oct. 22, 2004, and claims priority under 35 U.S.C. §365(a) to Japanese application number JP 2003-363462, filed Oct. 23, 2003, the disclosures of which are incorporated herein by reference.

1. FIELD OF THE INVENTION

This invention relates to fresh tea leaf powder and processed and treated tea leaves, tea extracts and tea aroma obtained by treating the fresh tea leaf powder. Further, the present invention relates to treated vegetables, treated fruits, treated flowers, fruit extracts, vegetable extracts, flower extracts (oil), vegetable aroma, fruit aroma and flower aroma obtained by treating the fresh tea leaf powder.

2. BACKGROUND OF THE INVENTION

Teas are roughly classified into three types depending on the extent of fermentation in the course of the production thereof, i.e., non fermented teas typified by green tea, semi fermented teas typified by Oolong tea and fully fermented teas typified by black tea, and they have been widely taken all over the world. Since these teas contain a lot of catechins, polyphenol and vitamin C, they are considered to be helpful for diet, beautification, and prevention of lifestyle-related diseases and so on. Thus a large number of investigations with teas have been currently proceeding.

Among all, green tea has been deeply rooted in Japanese culture, and it has been widely utilized not only for drinks but also, for example, for tea powder prepared by powdering teas as drink powder and food materials (see, for example, Patent Document 1). In addition, owing to the recent increasing tendencies toward fitness and nature loving, canned and PET-bottled tea drinks have gained consumers' popularity and have attracted much attention in the field of drinks not only in Japan but also in foreign countries.

In accordance with the diffusion of tea drinks in Japan in recent years, there have been required tasty tea drinks with rich flavor. Generally, expensive first plucked tea is used for producing tea drinks evaluated as being tasty and rich in flavor. Therefore, it is not practical to produce a tea drink with rich flavor by using such first plucked tea due to the high price. Although so-called late plucked teas, i.e., third and fourth plucked teas are less expensive, they have only poor aroma and strong bitterness and astringency. Accordingly, tea drinks produced by using them as the starting materials are inferior in taste, i.e., having strong bitterness and astringency and poor aroma. Therefore, various attempts have been made hitherto to improve the flavor.

For example, Patent Document 2 (JP-A-2003-153651) discloses that various types of teas are blended to impart sweetness in order to relieve bitterness and astringency. However, Patent Document 2 relates to the improvement in the taste, and there is no suggestion or description about aroma. In fact, the tea thus obtained has an improved taste but is unsatisfactory in aroma intensity.

On the other hand, Patent Document 3 (JP-A-2003-144049) discloses a method in which teas are treated with protease and tannase to increase components relating to the taste and the body. However, Patent Document 3 also relates to the improvement in the taste, and there is no suggestion or description about aroma. Moreover, no satisfactory taste can be obtained thereby.

Concerning attempts to improve aroma, there have been proposed methods in which teas employed as the starting materials or tea extracts obtained by extracting teas are treated with hot water with an enzyme such as β-glucosidase to thereby elevate the aroma intensity (see, for example, Patent Document 4). However, these methods are still insufficient in terms of giving a well-balanced and remarkably enriched aroma of various teas, since the tea aroma is seriously out of balance. In the process of tea drinks, moreover, tea aroma is damaged by heating or tea drink aroma is largely impaired by thermal degradation. Therefore, attempts have been made to compensate for the loss by adding synthetic flavors and the like. However, tea drinks having the natural tea aroma, in particular, the freshness of tea have not been obtained yet.

On the other hand, there have been proposed methods of improving the flavor of vegetable juice by treating a starting vegetable with cellulase or the like in the course of the production (see, for example, Patent Document 5). However, no satisfactory result can be obtained thereby. Further, with regard to flowers, it is required that flowers have an intense scent by themselves at the time of appreciation, and oil having a stronger scent is desired in the course of collecting oil from flower.

| | |
|---|---|
| Patent Document 1 | JP-A-Hei6-141775 |
| Patent Document 2 | JP-A-2003-153651 |
| Patent Document 3 | JP-A-2003-144049 |
| Patent Document 4 | JP-A-2001-286260 |
| Patent Document 5 | JP-A-2003-135000 |

3. DISCLOSURE OF THE INVENTION

In one embodiment, the invention encompasses providing tea, tea extracts and tea aroma having a rich flavor as in high-grade tea even by using so-called low-cost tea leaves such as third harvested tea and fourth harvested tea according to the safe and environment-friendly method. It is also intended to provide vegetables, fruits and extracts thereof having a rich flavor, flowers having an enriched scent and oil thereof.

That is to say, the invention encompasses providing fresh tea leaf powder having an excellent taste and giving a strong aroma.

In another embodiment, the invention encompasses providing processed and treated tea leaves, treated vegetables, treated fruits or treated flowers obtained by treating tea leaves, vegetables, fruits or flowers with the fresh tea leaf powder having an excellent taste and giving a strong aroma.

In another embodiment, the invention encompasses providing tea extracts, vegetable extracts, fruit extracts (fruit juice) or flower extracts (oil) obtained by treating extracts or slurry of tea, vegetables, fruits or flowers with the above-described fresh tea leaf powder or prepared from the above-described processed and treated tea leaves, treated vegetables, treated fruits or treated flowers.

In another embodiment, the invention encompasses providing tea aroma, vegetable aroma, fruit aroma or flower aroma having a well-balanced and enriched aroma which is obtained from the above-described tea extracts, vegetable extracts, fruit extracts or flower extracts by means of collecting aroma compounds. In another embodiment, the invention encompasses providing food and drink or cosmetics having a well-balanced and enriched aroma, which contain the above-described tea extracts, vegetable extracts, fruit extracts or flower extracts, or the above-described tea aroma, vegetable aroma, fruit aroma or flower aroma.

In another embodiment, the invention encompasses providing a method of preparing treated tea, treated vegetables, treated fruits or treated flowers, each treated with fresh tea leaf powder, which comprises adding the above-described fresh tea leaf powder to tea, vegetables, fruits or flowers.

As the results of intensive studies, the present inventors found that the above embodiments can be achieved by using a fresh tea leaf powder obtained by the specific process, thereby completing the present invention.

Namely, the present invention is as follows.

In one embodiment, the invention encompasses a fresh tea leaf powder which is obtainable by collecting a fresh leaf and/or a stem of tea plant (scientific name *Camellia sinensis*), followed by freeze-drying and subsequent milling the same.

In another embodiment, the invention encompasses a fresh tea leaf powder which is obtainable by collecting a fresh leaf and/or a stem of first harvested tea and/or second harvested tea of tea plant (scientific name *Camellia sinensis*), followed by freeze-drying and subsequent milling the same.

In another embodiment, the invention encompasses a fresh tea leaf powder, which is obtainable by, collecting said fresh tea leaf and keeping under shade conditions after collecting, followed by freeze-drying and subsequent milling the same.

In another embodiment, the invention encompasses a processed and treated tea leaf, a treated vegetable, a treated fruit or a treated flower which is obtainable by treating a tea leaf, a vegetable, a fruit or a flower with the fresh tea leaf powder.

In another embodiment, the invention encompasses a tea extract, a vegetable extract, a fruit extract or a flower extract, which is obtainable by treating an extract or slurry of a tea, a vegetable, a fruit or a flower with the fresh tea leaf powder.

In another embodiment, the invention encompasses a tea extract, a vegetable extract, a fruit extract or a flower extract prepared from the processed and treated tea leaf, the treated vegetable, the treated fruit or the treated flower.

In another embodiment, the invention encompasses tea aroma, vegetable aroma, fruit aroma or flower aroma which is obtainable by collecting an aroma compound from the tea extract, the vegetable extract, the fruit extract or the flower extract.

In another embodiment, the invention encompasses a food or drink comprising the tea extract, the vegetable extract, the fruit extract or the flower extract.

In another embodiment, the invention encompasses food or drink comprising the tea aroma, the vegetable aroma, the fruit aroma or the flower aroma.

In another embodiment, the invention encompasses a cosmetic comprising the tea extract, the vegetable extract, the fruit extract or the flower extract.

In another embodiment, the invention encompasses a cosmetic comprising the tea aroma, the vegetable aroma, the fruit aroma or the flower aroma.

In another embodiment, the invention encompasses a method of preparing a processed and treated tea, a treated vegetable, a treated fruit or a treated flower, each treated with a fresh tea leaf powder, which comprises adding the fresh tea leaf powder to a tea, a vegetable, a fruit or a flower.

4. BRIEF DESCRIPTION OF THE DRAWINGS

5. DETAILED DESCRIPTION OF THE INVENTION

Figure 1:
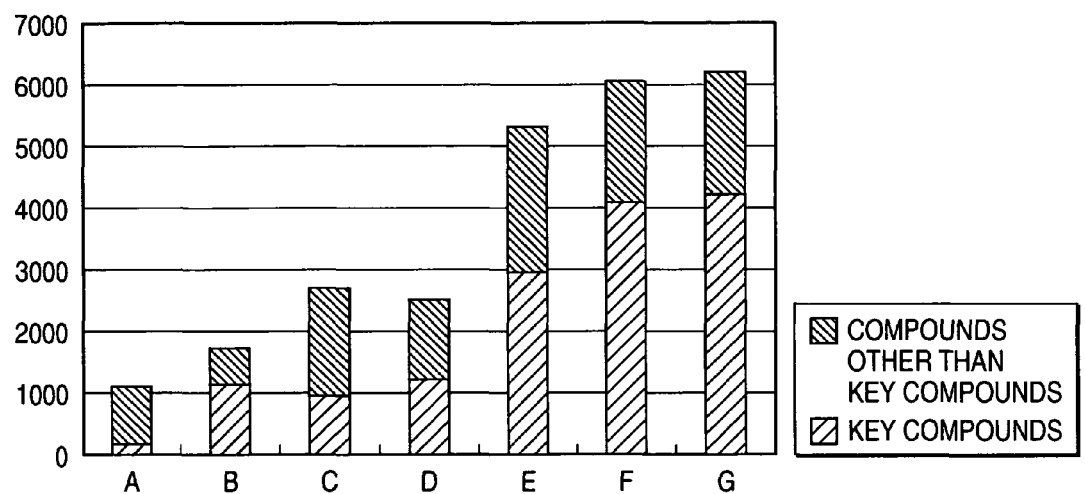
FIG. 1 is a graph which shows the contents of aroma compounds in various tea leaf extracts, solutions and extracts prepared in Examples.

Now, the present invention will be described in detail.

According to the present invention, as the tea employed as the starting material for the fresh tea leaf powder, use may be made of fresh leaves, stems and fresh buds of tea, which is a plant belonging to the family *Theaceae* (scientific name *Camellia sinensis*), without particular restriction.

Tea plants involve Chinese species (*Camellia Sinensis* var *sinensis*), Assam species (*Camellia Sinensis* var *assamica*), Cambodian species (*Camellia Sinensis* var ssp. *lasiocalyx*) and the like. Although any of them may be used in the present invention, Chinese species (var *sinensis*) used for green tea is particularly preferable.

In general, a tea bud formed from autumn to winter is coated with the bract and thus protected. When temperatures rise with the coming of spring, the bud is awaken from the winter diapause and the bract opens, thereby pushing out a new shoot (i.e., sprouting). The fresh sprout develops into leaves one by one, and the leaf development is completed after it develops into four or five leaves. Concerning the term "first harvested tea" as used in the present invention, the fresh sprouts thus shooting and growing are referred to as first harvested tea sprouts and a tea produced from these fresh sprouts is called first harvested tea, followed by second harvested tea, third harvested tea, fourth harvested tea and the like (late harvested tea).

Harvesting time somewhat varies depending on area and climate. In the case of Japanese green tea, for example, first harvested tea means those harvested from late March to late May, second harvested tea means those harvested from the middle in May to the middle in July, third harvested tea means those harvested from late June to the middle in September, while fourth harvested tea means those harvested in late July to late October.

The tea to be used in the present invention may be any of the first harvested tea to the fourth harvested tea and others (late harvested tea). It is also possible to pluck leaves, stems or both of leaves and stems for use. It is preferable to use second to fifth leaves per tip of first harvested tea and second harvested tea optionally containing stems, more preferably second to fifth leaves per center of first harvested tea optionally containing stems. From the viewpoint of giving a still preferable taste, it is most desirable to use second leaves per tip of first harvested tea.

The fresh tea leaf powder according to the present invention can be obtained by plucking fresh leaves of any of the first harvested tea to the fourth harvested tea and the like as described above, immediately (within 30 minutes after plucking) subsequently drying the leaves by freeze-drying, and then milling the leaves.

The term "freeze-drying" as used in the present invention means the process of freezing the plucked tea leaves by storing in a freezer, exposing to liquid nitrogen, etc., followed by drying the tea leaves sufficiently by using freeze-dryer usually employed.

The term "milling" means the process of finely milling the tea leaves, which have been dried by the freeze-drying, by using a mill usually employed. In the present invention, the tea leaves are milled into a size of, for example, about 20-mesh pass to thereby give fresh tea leaf powder.

Further, as another embodiment of the present invention, the fresh tea leaf powder according to the present invention can be obtained by allowing the fresh leaves obtained by plucking any of the first to fourth plucked teas and the like as described above, or the fresh leaves optionally provided physical damage, to stand under shade conditions at 4 to 50° C. for 30 minutes to 48 hours, followed by freeze-drying and milling the leaves in the same manner as described above.

The tea leaves may be freeze-dried immediately after plucking. However, it is preferable to carried out the freeze-drying after allowing the leaves to stand, and more preferably, after providing physical damage to the leaves and subsequent allowing the leaves to stand.

The standing temperature is preferably in the range of from 10 to 30° C., and more preferably from 15 to 25° C. (room temperature).

The term "physical damage" means to physically damage the tea leaves by cutting with a roll cutter or a roller, or grinding.

Alternatively, the fresh tea leaf powder according to the present invention can be obtained by giving an appropriate physical damage such as rubbing to tea leaves before plucking, i.e., tea leaves on standing trees, allowing the tea leaves to stand for 30 minutes to 72 hours, and plucking the tea leaves followed by freeze-drying and milling as described above.

The fresh tea leaf powder thus obtained contains a series of enzymes necessary for forming aroma of teas as well as various vegetables, fruits and flowers in a well-balanced manner. In addition, it is rich in taste factors such as amino acids. Owing to these characteristics, the fresh tea leaf powder acts on teas, vegetables, fruits and flowers to give excellent tastes and well-balanced aroma thereof efficiently. Namely, the fresh tea leaf powder can give excellent flavors.

The fresh tea leaf powder thus obtained may be further washed with acetone or ethanol and thus employed as a washed fresh tea leaf powder. Such a washed fresh tea leaf powder can be obtained by adding ice-cooled acetone or ice-cooled ethanol in an amount of more than three to five times of that of the fresh tea leaf powder to the fresh tea leaf powder, stirring the obtained mixture so as to make the solution to permeate into the powder, repeatedly filtering and washing, and removing the solvent from the filtration residue under reduced pressure at the time that the coloration (green) of the solution becomes faint after washing. In this case, acetone or ethanol employed as the washing solvent may be substituted by methanol or a hydrophilic solution (percentage of water content: 30% or less) thereof.

Alternatively, the washed fresh tea leaf powder can be obtained by adding the above-described solvent to the tea leaves plucked for obtaining the fresh tea leaf powder according to the present invention or frozen tea leaves, milling the same, then repeatedly filtering and washing and removing the solvent from the filtration residue under reduced pressure at the time that the coloration (green) of the solution becomes faint after washing.

The washed fresh tea leaf powder thus obtained is preferable since it is possible to enrich the aroma of teas other than green tea, vegetables, fruits or flowers in a well-balanced manner without damaging the inherent aroma by treating with teas other than green tea, vegetables, fruits or flowers, though it is inferior in the taste-imparting effect to the fresh tea leaf powder.

According to the present invention, processed and treated tea leaves or tea extracts, which show an excellent taste and a well-balanced and enriched aroma, can be obtained by treating at least one type of tea leaves, tea extract or slurry selected from the group of non fermented teas, semi fermented teas and fully fermented teas such as green tea, black tea and Oolong tea with the above-described fresh tea leaf powder or washed fresh tea leaf powder.

It is also possible to obtain vegetables or flowers, or extract, oil or well-balanced and enriched aroma by treating vegetables, fruits, flowers, or extract or fruit juice thereof.

Specific examples of the tea to be treated with the fresh tea leaf powder according to the present invention include non fermented teas (for example, green tea, Sen-cha, Kabuse-cha, Gyokuro, Ten-cha, Mat-cha, Tamaryoku-cha, ban-cha, hoji-cha, kamairi-cha, and the like), semi fermented teas (for example, Arisan-cha, Tekkannon-cha, Oolong tea, and the like), fully fermented teas (for example, black tea, Awa-ban-cha, Goishi-cha, Toyama-kurocha, Sen-cha, and the like). Use may be also made of products obtained by blending two or more of the above-described teas at an appropriate rate.

Specific examples of the vegetable to be treated with the fresh tea leaf powder according to the present invention include corn, onion and carrot. Specific examples of the fruits to be treated include grape, papaya, pineapple, apricot, peach, passion fruit, apple, banana, melon and strawberry. Specific examples of the flowers to be treated include rose, Cape jasmine, jasmine and lavender.

One of the major object of the present invention is to obtain tea leaves, tea extracts or tea aroma having a rich flavor comparable to a high-grade tea even by starting with so-called low-grade tea leaves such as third harvested tea and fourth harvested tea, tea extract or tea slurry by the treatment with the fresh tea leaf powder. It is also possible to treat a high-grade tea (first harvested tea) to give a further improved flavor.

The term "tea extract" as used herein means the extract of tea leaves and/or stems.

As the tea extract, vegetable extract, fruit extract (fruit juice) and oil to be used in the present invention, use may be made of either commercial products or handmade products. These tea extract, vegetable extract and fruit extract (fruit juice) may be prepared by a method usually employed. For example, tea extract may be obtained by supplying tea leaves into an extraction vessel, soaking the tea leaves in a definite amount of water for a certain period of time and then removing the tea leaves to give the extract. Alternatively, it can be prepared by packing tea leaves into an extraction tank and feeding water at a definite ratio to give the extract in a definite amount. As the water to be used for the extraction, tap water, ion-exchanged water, distilled water, natural water, natural mineral water, degassed water, water containing ascorbic acid dissolved therein, pH-adjusted water (including buffering solution) and the like may be mentioned. For the extraction, it is preferable to employ water in an amount of 10 times or more, more preferably 10 to 15 times, with respect to that of the tea leaves. The temperature of the water to be used in the extraction is usually in the range of from 4° C. to 90° C., though it is not particularly restricted so long as the extraction can be carried out. The extraction time may be determined in accordance with usual conditions without specific restriction.

The term "slurry" as used in the present invention means materials prepared by adding a definite amount of water to tea leaves, vegetables, fruits or flowers milled into an appropriate size.

The term "processed and treated tea leaves" as used in the present invention means fresh tea leaves before processing, tea leaves subjected to one or more of the steps in the tea manufacturing process such as rough withering, soft withering, medium withering and final withering, or tea leaves subjected throughout the tea manufacturing process.

Next, conditions for the treatment of the fresh tea leaf powder (including washed fresh tea leaf powder) will be described in greater detail.

(Treatment of Tea Extract, Tea Slurry, Vegetable Extract, Vegetable Slurry, Fruit Extract (Fruit Juice) or Fruit Juice Slurry)

In the treatment, it is preferable to add the fresh tea leaf powder in an amount of from 0.001 to 10% by mass based on the mass of the extract or the slurry. It is preferable to carry out the treatment for 0.5 to 48 hours, still preferably for 0.5 to 12 hours. The treating temperature is preferably in the range of from 4 to 65° C., still preferably from 15 to 55° C.

(Treatment of Tea Leaves, Vegetables, Fruits or Flowers)

In the treatment, it is preferable to soak the tea leaves, vegetables, fruits or flowers to be treated in the fresh tea leaf powder solution which is prepared by dissolving in an appropriate solvent (although any solvents allowing the exertion of enzymatic activity such as water or a buffer solution may be used, water is particularly favorable) to give a final concentration of 0.001 to 5%, or add the fresh tea leaf powder solution by spraying. The treatment time is preferably from 0.5 to 72 hours, still preferably from 0.5 to 48 hours and more preferably from 0.5 to 12 hours. The treating temperature is preferably in the range of from 4 to 65° C., still preferably from 10 to 40° C.

For example, essential oil (flower oil) having an enriched aroma can be obtained by the methods conventionally employed for collecting an essential oil (flower extract) from flower such as the fat adsorption method, the solvent extraction method or the liquefied gas extraction method after spraying an aqueous solution of the washed fresh tea leaf powder of about 0.01 to 1% in concentration uniformly over fresh picked flowers and buds of, such as rose, jasmine and lavender, and allowing to stand the same at 10 to 40° C. for 0.5 to 12 hours under shade conditions.

The extract or the slurry treated with the fresh tea leaf powder is heated (for example, at a temperature of 80° C. or higher for 10 minutes) to inactivate the enzymes to thereby give the extract or fruit juice. The slurry treated with the fresh tea leaf powder is subjected to solid/liquid separation by a procedure such as filtration or centrifugation to give the extract. Then the enzymes are inactivated by conducting a heat treatment.

Treated tea leaves, treated vegetables, treated fruits or treated flowers can be obtained by treating the subject tea leaves, vegetables, fruits or flowers with the fresh tea leaf powder and heating (exposing to steam for 0.5 minute to 3 minutes) to thereby inactivate enzymes.

The aroma is collected by the means of collecting aroma compounds from the extract or slurry treated with the fresh tea leaf powder, usually after conducting an enzymatic treatment. As the method for collecting the aroma compounds, use may be made of any conventional methods to be used in distillation, extraction and immersion.

As the distillation method, distillation and rectification may be mentioned. With regard to a device, a method with the use of a distillation column can be employed. As the distillation conditions, atmospheric distillation, distillation under reduced pressure, vacuum distillation, pressure distillation, steam distillation, carbon dioxide gas distillation, molecular distillation, dry distillation, azeotropic distillation, extraction distillation and the like may be mentioned. Also, use can be made of either the batch type, the continuous type or the semi continuous type.

Examples of the extraction and immersion methods include the cold immersion method, the hot immersion method, the batch extraction method, the multistage extraction method, the multiple extraction method, the countercurrent multistage extraction method, the countercurrent continuous extraction method, the continuous differential extraction method, gas-liquid extraction, liquid carbon dioxide extraction, supercritical extraction and so on.

As the process of collecting aroma compounds that is particularly preferable in the present invention, citation may be made of the gas-liquid countercurrent contact extraction method (Spinning Cone Column: SCC), which is a certain kind of a thin film steam distillation device, since the top note aroma frequently damaged by heat can be collected within a short heating time and at a low heating temperature in the conditions that the enriched aroma compounds are concentrated in the extract in the course of the enzymatic treatment. The SCC method is described in detail in JP-A-9-308455, JP-A-2002-105485, JP-A-2002-105486 and JP-A-2002-142713.

By treating each extract by the means of collecting aroma compounds according to the SCC method, various aroma can be separated and collected from the extract. Further, by blending the thus collected aroma with the residual extract in an appropriate rate, concentrated aroma extracts having various aroma intensities can be obtained.

The fresh tea leaf powder may be used together with enzymes. Examples of the enzyme include enzymes such as glucosidase, hydroxynitrile lyase, esterase, ester synthetase, lactone synthetase, xanthine oxidase, hydroxylase, decarboxylase and alcoholdehydrogenase, enzymes such as lipase decomposing lipids, protease decomposing proteins into amino acids, cellulase decomposing cell wall, tannase decomposing tannin, pectinase decomposing pectin, protopectinase decomposing protopectin which participates in cell adhesion, phospholipase decomposing phospholipids which constitutes biomembranes and oligoglucosidase, and enzymes such as polyphenol oxidase, lipoxygenase, hydroperoxide lyase.

The extracts, aroma and concentrated aroma extracts obtained by the above-described methods can be used in drinks, alcoholic drinks, frozen desserts, desserts, baked goods, tablet candies, candies, chewing gums, unbaked cakes and the like. More specifically, drinks such as tea drinks (green tea, Oolong tea, black tea, blended tea, etc.), milk drinks, sport drinks, near water drinks, nutrition-supplement drinks and carbonated drinks; alcoholic drinks such as sparkling liquors and cocktails; frozen desserts and desserts such as pudding, bavarois, jelly, yogurt, sherbet and ice cream; baked goods such as cookies and biscuits; unbaked cakes such as steamed bean jam buns, sponge cakes and cakes; candies; tablets and chewing gums. Moreover, they are applicable in the field of cosmetics such as air freshener.

It is also possible to add, to the extracts, aroma and concentrated aroma extracts thus obtained, various additives, for example, a stabilizer (an antioxidant) such as vitamin C or vitamin E, a thickener such as dextrin, xanthan gum, lecithin or gelatin, various colorants, an antibacterial agent such as benzoic acid, a surfactant such as a polyoxyethylene alkyl ether or an alkylolamide, a flavor and fragrance and a pH controlling agent such as sodium bicarbonate, citric acid or malic acid and the like.

The extract thus obtained may be powdered by distilling off the solvent by, for example, the spray dry method. Alternatively, it may formulated into oil by extracting with adding oil or fat such as soybean oil, rice oil, rapeseed oil, corn oil or middle-chain fatty acid triglycerides, followed by collecting the oily phase.

6. EXAMPLES

Although Examples, Comparative Examples and Referential Examples of the present invention will be described hereinafter, the present invention is not restricted to the following Examples.

Comparative Example 1

(Method of Preparing Tea Powder)

A Natural green tea (variety: Yabukita) usually sold in a supermarket, etc. was milled with a mill and then passed through a 40-mesh sieve to give a tea powder. This tea powder was employed as a control (h) for fresh tea leaf powder.

Referential Example 1

(Method of Preparing High-Grade Tea Extract)

By adding 500 ml of water, 50 g of green tea leaves (variety: Yame Okumidori or Koshun) were extracted at 50° C. for 3 hours under stirring. Then the solid part was separated from the liquid part by filtering through a gauze sheet. Next, the filtrate was treated at 80° C. for 10 minutes. After the treatment, it was quickly ice-cooled to room temperature (25° C.) to give the extract of high-grade tea leaves.

6.1. Example 1

(1) Preparation of Fresh Tea Leaf Powder

First harvested tea leaves (two to five leaves per center, early May) of green tea (variety: Yabukita) were plucked, washed with water and then freeze-dried. The fresh tea leaves were milled with a mill and passed through a 40-mesh sieve to give a fresh tea leaf powder (a) (an invention example). Separately, part of fresh plucked tea leaves were allowed to stand under shade conditions at room temperature (25° C.) for 1 to 48 hours and freeze-dried. Next, these leaves were milled with a mill and passed through a 40-mesh sieve to give fresh tea leaf powders (b) to (e) (invention examples). Further, part of the remainder of the fresh plucked tea leaves were physically damaged with a roll cutter and then allowed to stand under shade conditions at room temperature (25° C.) for 6 to 48 hours. Next, these leaves were freeze-dried, milled with a mill and passed through a 40-mesh sieve to give fresh tea leaf powders (f), (g) and (i) (invention examples).

Next, the fresh tea leaf powders employed in the Example will be summarized.

Fresh tea leaf powder (a): the product obtained by freeze-drying immediately after plucking.

Fresh tea leaf powder (b): the product obtained by plucking, allowing to stand under shade conditions at room temperature for 1 hour and then freeze-drying.

Fresh tea leaf powder (c): the product obtained by plucking, allowing to stand under shade conditions at room temperature for 6 hours and then freeze-drying. Fresh tea leaf powder (d): the product obtained by plucking, allowing to stand under shade conditions at room temperature for 24 hours and then freeze-drying.

Fresh tea leaf powder (e): the product obtained by plucking, allowing to stand under shade conditions at room temperature for 48 hours and then freeze-drying.

Fresh tea leaf powder (f): the product obtained by treating with a roll cutter, allowing to stand under shade conditions at room temperature for 6 hours and then freeze-drying.

Fresh tea leaf powder (g): the product obtained by treating with a roll cutter, allowing to stand under shade conditions at room temperature for 24 hours and then freeze-drying.

Fresh tea leaf powder (i): the product obtained by treating with a roll cutter, allowing to stand under shade conditions at room temperature for 48 hours and then freeze-drying.

(2) Preparation of Washed Fresh Tea Leaf Powder

To the fresh tea leaf powder (f) obtained in the above (1), 10 times by mass as much ice-cooled acetone having a temperature of −20° C. was added. After stirring, the mixture was quickly filtered under reduced pressure. The residue was washed with 10 times by mass as much ice-cooled acetone having a temperature of −20° C. thrice, and then the solvent was almost completely removed under reduced pressure to obtain a washed fresh tea leaf powder (w).

(3) Enzymatic Activity of Fresh Tea Leaf Powder

Enzymatic activities of each of the tea powder (h) and the fresh tea leaf powders (a), (b), (c), (d), (e), (f), (g) and (i) were measured as follows.

1. β-Glucosidase Activity

Measurement was made in accordance with a method described in Biosci. Biotech. Biochem., 60(11), 1810-1814, 1996.

Substrate: pNP-β-D-glucopyranosides (purchased from SIGMA)

Enzyme: 10 mg of fresh tea leaf powder/10 mL of water

Liquid reaction mixture (1 mL):
  3750 μL of 20 mM citrate buffer (pH 6.0)
  1000 μL of enzyme solution (10 mg/mL)
  250 μL of 10 mM substrate solution Reaction conditions: The liquid reaction mixture was prepared, quickly stirred and then allowed to stand at 37° C. for 15 minutes. Next, the reaction was stopped by adding 2500 μL of a 1 M sodium carbonate solution.

Detection: UV 405 nm

One unit: causing an increase by 0.001 in the absorption of OD 405 nm under the above conditions.

The results are shown in Table 1.

TABLE 1

| Fresh tea leaf powder | Unit | Note |
| --- | --- | --- |
| Tea powder (h) | 0 | Comparative example |
| Fresh tea leaf powder (a) | 12 | Invention example |
| Fresh tea leaf powder (b) | 16 | Invention example |
| Fresh tea leaf powder (f) | 36 | Invention example |
| Fresh tea leaf powder (g) | 61 | Invention example |
| Fresh tea leaf powder (i) | 58 | Invention example |

2. Polyphenol Oxidase Activity

Measurement was made in accordance with a method described in Phytochemistry, vol. 12, 21-24, 1973.

Substrate: (+)-catechin (purchased from SIGMA)

Enzyme: 100 mg of fresh tea leaf powder/10 mL of water

Liquid reaction mixture (6 mL):
  0.1 M citric acid solution;
  0.2 M sodium phosphate solution;
  0.003 M substrate solution; and
  1 mL of enzyme solution.

Reaction conditions: The liquid reaction mixture was prepared, quickly stirred and then allowed to stand at 35° C. for 10 minutes.
Detection: UV 420 nm
One unit: causing an increase by 0.001 in the absorption of OD 420 nm under the above conditions.
The results are shown in Table 2.

TABLE 2

| Fresh tea leaf powder | Unit | Note |
|---|---|---|
| Tea powder (h) | 0 | Comparative example |
| Fresh tea leaf powder (a) | 32 | Invention example |
| Fresh tea leaf powder (b) | 63 | Invention example |
| Fresh tea leaf powder (f) | 127 | Invention example |
| Fresh tea leaf powder (g) | 216 | Invention example |
| Fresh tea leaf powder (i) | 207 | Invention example |

3. Lipoxygenase Activity

Measurement was made in accordance with a method described in J. Agric. Food Chem. 41, 1677-1683, 1993.

Substrate: 7.5 mM linoleic acid (purchased from NACALAI TESQUE, Inc.), 0.25% linolenic acid (purchased from NACALAI TESQUE, Inc.) and Tween 20 (purchased from NACALAI TESQUE, Inc.)/0.1 M borate buffer solution having a pH of 9 Enzyme: 100 mg of fresh tea leaf powder/10 mL of water
Liquid reaction mixture (4 mL):
3 mL of substrate solution +1 mL of enzyme solution
Reaction conditions: The liquid reaction mixture was prepared, quickly stirred and then allowed to stand at 30° C. for 15 minutes.
Detection: After diluting the liquid reaction mixture 20-fold with water, measurement was made at UV 234 nm.
One unit: causing an increase by 0.001 in the absorption of OD 234 nm under the above conditions.
The results are shown in Table 3.

TABLE 3

| Fresh tea leaf powder | Unit | Note |
|---|---|---|
| Tea powder (h) | 0 | Comparative example |
| Fresh tea leaf powder (a) | 104 | Invention example |
| Fresh tea leaf powder (b) | 295 | Invention example |
| Fresh tea leaf powder (f) | 355 | Invention example |
| Fresh tea leaf powder (g) | 886 | Invention example |
| Fresh tea leaf powder (i) | 893 | Invention example |

(3) Effect of Treatment on Green Tea (Treatment of Slurry)

To 50 g of third and fourth harvested green tea leaves (variety: Yabukita) having been milled into an appropriate size with a mill, 500 mL of water and 0.25 g (0.05% by mass based on water), 0.5 g (0.1% by mass based on water) or 5 g (1% by mass based on water) of each of the fresh tea leaf powders (a) to (i) according to the present invention or the tea powder (h) of the comparative example were added and extraction reaction was carried out at 50° C. for 3 hours under stirring. Then the solid part was separated from the liquid part by filtering through a gauze sheet. Next, the filtrate was treated at 80° C. for 10 minutes to thereby inactivate enzymatic activities. After the completion of the treatment, it was quickly ice-cooled to room temperature (25° C.) to give each green tea extract treated with the powder according to the present invention.

For comparison, a tea extract was prepared by the same method as described above except adding no fresh tea leaf powder, and another tea extract was prepared by the same method as described above except adding 0.25 g (0.05% by mass based on water) of β-glucosidase (manufactured by SIGMA) as a substitute for the fresh tea leaf powder according to the present invention.

Treatment of Extract

To 50 g of third and fourth plucked green tea leaves, 500 mL of water was added and extraction was carried out at 60° C. for 5 minutes. Next, the solid part was separated from the liquid part by filtering through a gauze sheet. Then it was quickly ice-cooled to give a green tea extract.

For comparison, a low-grade tea extract was prepared by the same method as described above except adding no fresh tea leaf powder and a β-glucosidase-treated low-grade tea extract was prepared by the same extraction method as described above except adding 0.25 g (0.05% by mass based on water) of β-glucosidase (manufactured by SIGMA) as a substitute for the fresh tea leaf powder according to the present invention.

To 50 g of the green tea extract thus obtained, 0.25 g (0.05% by mass based on water), 0.5 g (0.1% by mass based on water) or 5 g (1% by mass based on water) of each of the fresh tea leaf powders according to the present invention or the comparative tea powders was added followed by reaction at 50° C. for 3 hours under stirring. Then the solid part was separated from the liquid part by filtering through a gauze sheet. Next, the filtrate was treated at 80° C. for 10 minutes to thereby inactivate enzymatic activities. After the completion of the treatment, it was quickly ice-cooled to give each green tea extract treated with the powder.

(Sensory Evaluation)

Each of the obtained green tea extract was diluted 5-fold with water and subjected to a sensory evaluation by five skilled panelists in accordance with the following criteria. The numerical data given in the following Table correspond to averages in the evaluation.

Aroma Intensity: Concerning the Effect of Enriching Aroma
1) Not perceptible, i.e., similar to the untreated one.
2) Somewhat perceptible.
3) Clearly perceptible.
4) Remarkably perceptible.

Taste: Compared with Untreated One
1) No change.
2) Somewhat perceptible effect of enriching taste.
3) Clearly perceptible effect of enriching taste.
4) Remarkably perceptible effect of enriching taste.

The results are shown in the following Tables 4 and 5.

TABLE 4

| | Treatment of slurry | | |
|---|---|---|---|
| | Fresh tea leaf powder | | |
| Type | Content (based on water) | Aroma intensity | Taste |
| Untreated | — | — | — |
| Yame Okumidori ref. example | — | 3.6 | 4.0 |
| Koshun (ref. example) | — | 3.8 | 4.0 |
| β-Glc (comp. example) | 0.05% | 2.2 | 1.2 |
| (h) (comp. example) | 1.0% | 1.2 | 2.2 |
| (a) (Invention example) | 0.05% | 3.0 | 3.4 |
| (b) (Invention example) | 0.05% | 3.0 | 3.4 |

TABLE 4-continued

Treatment of slurry

Fresh tea leaf powder

| Type | Content (based on water) | Aroma intensity | Taste |
|---|---|---|---|
| (b) (Invention example) | 0.1% | 3.2 | 3.4 |
| (b) (Invention example) | 1.0% | 3.8 | 3.8 |
| (c) (Invention example) | 0.05% | 3.4 | 3.6 |
| (d) (Invention example) | 0.05% | 3.8 | 3.4 |
| (e) (Invention example) | 0.05% | 3.6 | 3.2 |
| (f) (Invention example) | 0.05% | 3.6 | 3.6 |
| (f) (Invention example) | 0.1% | 3.8 | 3.6 |
| (f) (Invention example) | 1.0% | 4.0 | 4.0 |
| (g) (Invention example) | 0.05% | 4.0 | 3.2 |
| (i) (Invention example) | 0.05% | 4.0 | 3.0 |

TABLE 5

Treatment of extract

Fresh tea leaf powder

| Type | Content (based on water) | Aroma intensity | Taste |
|---|---|---|---|
| Untreated | — | — | — |
| Yame Okumidori (ref. example) | — | 3.8 | 4.0 |
| Koshun (ref. example) | — | 4.0 | 4.0 |
| β-Glc (comp. example) | 0.05% | 2.2 | 1.2 |
| (h) (comp. example) | 1.0% | 1.2 | 2.2 |
| (f) (Invention example) | 0.05% | 3.8 | 3.8 |
| (f) (Invention example) | 0.1% | 4.0 | 3.8 |
| (f) (Invention example) | 1.0% | 4.0 | 4.0 |

Preparation of Fresh Tea Leaf Powder

Fresh leaves of fourth harvested tea (second to fifth leaves per tip, middle in October) of green tea (variety: Yabukita) were plucked and then treated as in the first harvested tea to give the following fresh tea leaf powders.

Fresh tea leaf powder (j): the product obtained by plucking and then freeze-drying.

Fresh tea leaf powder (k): the product obtained by plucking, then immediately treating with a roll cutter, allowing to stand under shade conditions for 6 hours and then freeze-drying.

Effect of Treatment on Green Tea

To 50 g of the leaves of third and fourth harvested tea of green tea (variety: Yabukita), 500 mL of water was added and extraction was carried out at 60° C. for 5 minutes. Then the solid part was separated from the liquid part by filtering through a gauze sheet. Next, the filtrate was quickly ice-cooled to give a green tea extract.

To 50 g of the green tea extract thus obtained, 50 mg (0.1% by mass based on the tea leaves) of the tea powder (h) or the fresh tea leaf powder (j) or (k) was added and reaction was carried out at 50° C. for 3 hours under stirring. After separating the solid part from the liquid part by filtering through a gauze sheet, the filtrate was treated at 80° C. for 10 minutes. After the completion of the treatment, it was quickly ice-cooled to give a powder-treated green tea extract.

(Sensory Evaluation)

Sensory evaluation was performed by the same method as in the first harvested fresh tea leaf powder.

The results are shown in Table 6.

TABLE 6

| Green tea powder | | Aroma intensity | Taste |
|---|---|---|---|
| Untreated (comp. example) | — | — | — |
| (h) (comp. example) | 0.1% | 1.2 | 2.2 |
| (j) (invention example) | 0.1% | 3.2 | 3.0 |
| (k) (invention example) | 0.1% | 3.6 | 3.0 |

Example of Aroma Production

Third and fourth plucked leaves of green tea (variety: Yabukita) were milled with a grinder (masukoroyder™) under adding water to prepare 100 kg of slurry having a concentration of 10% (w/w). Then, 50 g of the fresh tea leaf powder (c) of Example 1 was added thereto and the resultant mixture was gently stirred at 25° C. for 3 hours. After filtering, the filtrate was supplied to an SCC device operated under the following conditions so as to collect green tea aroma and green tea extract residue. The green tea extract residue was further filtered through celite to give a clarified green tea extract. The green tea aroma and the green tea extract were mixed at a ratio of 1:10 to obtain green tea aroma concentrated extract.

SCC operating conditions:
Material feeding rate: 700 L/h
Column temperature: 100° C.
Strip ratio: 2%

As the controls, green tea aroma was prepared by the same method with the use of the SCC device as described above except not adding 50 g of the fresh tea leaf powder of Example 1 (c), and tea powder-treated green tea aroma was prepared by the same method with the use of the SCC device as described above except adding 50 g of the tea powder (h) as a substitute for 50 g of the fresh tea leaf powder of Example 1 (c).

(Sensory Evaluation)

Each of the treated green tea aroma thus obtained was diluted 10-fold with water and subjected to a sensory evaluation by five skilled panelists in accordance with the following criteria. The numerical data given in the following Table correspond to averages in the evaluation.

1) No effect of enriching aroma, i.e., similar to the untreated one.
2) Somewhat perceptible effect of enriching aroma.
3) Clearly perceptible effect of enriching aroma.
4) Remarkably perceptible effect of enriching aroma.

Table 7 shows the results.

TABLE 7

| Each of treated green tea aroma | Aroma intensity |
|---|---|
| Untreated | — |
| Treated with tea powder | 1.2 |
| Treated with fresh tea leaf powder | 4.0 |

(4) Effect of Treatment on Black Tea (Treatment of Extract)

To 50 g of a black tea extract (Brix 15), 100 mL of water was added to give a dilution. To 50 g of the dilution, 500 mg (1% by mass based on the dilution) or 50 mg (0.1% by mass based on the dilution) of the fresh tea leaf powder (b) or (f) was added, and treatment was carried out at 50° C. for 3 hours under stirring. Then the solid part was separated from the liquid part by filtering through a gauze sheet. Next, the filtrate was treated at 80° C. for 10 minutes. After the completion of the treatment, it was quickly ice-cooled to about room temperature (25° C.) to give a black tea extract.

For comparison, an untreated black tea extract was prepared by the same method as described above except adding no fresh tea leaf powder, a black tea extract treated with β-glucosidase was prepared by the same method as described above except carrying out the extraction by adding 25 mg (0.05% by mass based on the dilution) of β-glucosidase (manufactured by SIGMA) as a substitute for the fresh tea leaf powder according to the present invention, and another black tea extract was prepared by the same method as described above except adding 500 mg (1% by mass based on the dilution) of the tea powder (h) as a substitute for the fresh tea leaf powder according to the present invention.

(Sensory Evaluation)

Each of the black tea extracts treated with the powder thus obtained was diluted 10-fold with water and subjected to a sensory evaluation by five skilled panelists in accordance with the following criteria. The numerical data given in the following Table correspond to averages in the evaluation.

Aroma Intensity: Concerning the Effect of Enriching Aroma
  1) Not perceptible, i.e., similar to the untreated one.
  2) Somewhat perceptible.
  3) Clearly perceptible.
  4) Remarkably perceptible.

Taste: Compared with Untreated One
  1) No change.
  2) Somewhat perceptible effect of enriching taste.
  3) Clearly perceptible effect of enriching taste.
  4) Remarkably perceptible effect of enriching taste.

The results are shown in the following Table 8.

TABLE 8

| Green tea powder | | Aroma intensity | Taste |
|---|---|---|---|
| Untreated | — | — | — |
| β-Glc (comp. example) | 0.05% | 2.2 | 1.2 |
| (h) (comp. example) | 1.0% | 1.0 | 2.4 |
| (b) (Invention example) | 0.1% | 3.4 | 3.4 |
| (b) (Invention example) | 1.0% | 3.8 | 3.8 |
| (f) (Invention example) | 0.1% | 3.6 | 3.8 |
| (f) (Invention example) | 1.0% | 4.0 | 4.0 |

(5) Effect of Treatment on Oolong Tea (Treatment of Extract)

To 50 g of an Oolong tea extract (Brix 15), 100 mL of water was added to give a dilution. To 50 g of the dilution, 500 mg (1% by mass based on the dilution) or 50 mg (0.1% by mass based on the dilution) of the fresh tea leaf powder (b) or (f) was added and treatment was carried out at 50° C. for 3 hours under stirring. Then the solid part was separated from the liquid part by filtering through a gauze sheet. Next, the filtrate was treated at 80° C. for 10 minutes. After the completion of the treatment, it was quickly ice-cooled to about room temperature (25° C.) to give an Oolong tea extract.

For comparison, an untreated Oolong tea extract was prepared by the same method as described above except adding no fresh tea leaf powder, an Oolong tea extract treated with β-glucosidase was prepared by the same method as described above except carrying out the extraction by adding 25 mg (0.05% by mass based on the dilution) of β-glucosidase (manufactured by SIGMA) as a substitute for the fresh tea leaf powder according to the present invention, and an Oolong tea extract was prepared by the same method as described above except adding 500 mg (1% by mass based on the dilution) of the tea powder (h) as a substitute for the fresh tea leaf powder according to the present invention.

(Sensory Evaluation)

Each of the Oolong tea extracts thus obtained was diluted 10-fold with water and subjected to a sensory evaluation by five skilled panelists in accordance with the following criteria. The numerical data given in the following Table correspond to averages in the evaluation.

Aroma Intensity: Concerning the Effect of Enriching Aroma
  1) Not perceptible, i.e., similar to the untreated one.
  2) Somewhat perceptible.
  3) Clearly perceptible.
  4) Remarkably perceptible.

Taste: Compared with Untreated One
  1) No change.
  2) Somewhat perceptible effect of enriching taste.
  3) Clearly perceptible effect of enriching taste.
  4) Remarkably perceptible effect of enriching taste.

The results are shown in the following Table 9.

TABLE 9

| Green tea powder | | Aroma intensity | Taste |
|---|---|---|---|
| Untreated | — | — | — |
| β-Glc (comp. example) | 0.05% | 2.2 | 1.2 |
| (h) (comp. example) | 1.0% | 1.2 | 2.2 |
| (b) (Invention example) | 0.1% | 3.4 | 3.4 |
| (b) (Invention example) | 1.0% | 3.8 | 3.8 |
| (f) (Invention example) | 0.1% | 3.6 | 3.8 |
| (f) (Invention example) | 1.0% | 4.0 | 4.0 |

(Analysis of Aroma)

The aroma-enriching effects of the treatment with the fresh tea leaf powder were examined by the GC analysis.

namely, to 50 g of green tea leaves of third and fourth harvested tea milled into an appropriate size with a mill, 500 mL of water and 0.25 g (0.05% by mass based on water) of the fresh tea leaf powder (b) or (f) according to the present invention were added and extraction reaction was carried out at 50° C. for 3 hours under stirring. Then the solid part was separated from the liquid part by filtering through a gauze sheet. Next, the filtrate was treated at 80° C. for 10 minutes. After the completion of the treatment, it was quickly ice-cooled to about room temperature (25° C.).

The obtained products were referred to respectively as powder-treated green tea extract (F) and (G).

As the controls, use was made of the low-grade tea leaf extract (A) as described above which was not treated with the fresh tea leaf powder, an aqueous solution of fresh tea leaf powder (B) obtained by the same method as described above except adding 1% by mass of the fresh tea leaf powder to water as a substitute for the low-grade tea, a low-grade tea leaf extract treated with β-glucosidase (C) which was obtained by the same method as described above except carrying out the reaction and extraction by adding 0.25 g (0.05% by mass based on water) of β-glucosidase (manufactured by SIGMA) to the low-grade tea as a substitute for the fresh tea leaf powder, and two high-grade tea leaf extracts (D) and (E) which were obtained by the same method as described above without conducting an enzymatic treatment starting with two types of high-grade tea leaves (trade name: Yame Okumidori manufactured by Gonoe Seicha and trade name: Koshun manufactured by Akiyama-en).

Comparison of Aroma Compound Contents by Fresh Tea Leaf Powder-Treatment

After adding 10 µL of a 5-nonanone solution (10.1 mg/500 mL) employed as an internal standard to 10 g of each treated liquid, an adsorption treatment was carried out by the SBSE (Stir Bar Sorptive Extraction) method.

Measurement Instruments
Thermal desorption system: (Gerstel)
Gas chromatograph: HP6890 (Hewlett Packard)
Mass selective detector: HP5973N (Hewlett Packard)

Measuring conditions:
Thermal desorption conditions: 220° C., 15 minutes

Gas Chromatography Conditions:
Column: Stabilwax 30 m×0.25 mm I.D. 0.25 µm df (RESTEK)
Mode: splitless
Temperature: 60° C. (5 min) to 230° C., rising speed 5° C./min
Inlet temperature: 250° C.
Interface: 230° C.
Carrier gas: helium.

Figure 2:
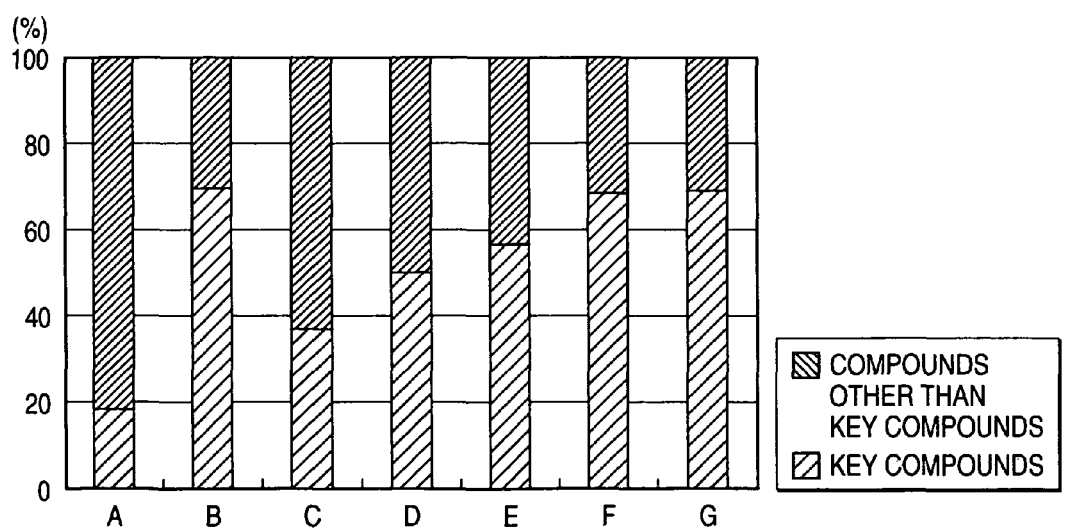
FIG. 2 is a graph which shows the ratios of a key aroma compounds to the total amounts of various tea leaf extracts, solutions and extracts prepared in Examples.

Mass Selective Detector Conditions
Ionization voltage: 70 eV
Detection mode: total ion chromatogram
The results are shown in Table A, and FIGS. 1 and 2.

TABLE A

| Compound | A | B | C | D | E | F | G |
|---|---|---|---|---|---|---|---|
| Hexanal | 40.32 | 62.75 | 46.40 | 29.13 | 62.10 | 47.72 | 43.98 |
| 4-Methyl-3-penten-2-one | — | — | — | 139.15 | 131.28 | — | — |
| 2-Methyl-2-pentenal | 19.32 | — | 30.78 | — | — | 43.11 | 40.86 |
| Heptanal | 12.72 | 16.16 | 5.98 | 58.40 | — | 26.80 | 28.16 |
| Trans-2-hexenal(*) | 18.18 | 48.55 | 14.08 | 6.92 | 8.06 | 92.62 | 75.34 |
| Trans-2-heptenal | — | 2.34 | — | — | — | — | — |
| 5-Nonanone (i.s.) | 100.00 | 100.00 | 100.00 | 100.00 | 100.00 | 100.00 | 100.00 |
| 6-Methyl-5-hepten-2-one | 67.92 | 2.39 | 96.10 | 9.78 | 16.00 | 93.52 | 90.29 |
| Hexanol (*) | — | 8.26 | 9.18 | 8.12 | 8.76 | 26.67 | 28.41 |
| Cis-3-hexenol(*) | 1.18 | 90.57 | 151.13 | 15.59 | 5.43 | 163.03 | 190.24 |
| Nonanol | 2.27 | 11.37 | 10.65 | 12.81 | — | 23.50 | 27.95 |
| 3,5,5-Trimethyl-2-cyclohexen-1-one | 14.57 | — | 20.02 | — | — | 24.49 | 22.81 |
| Trans-2-octenal | 11.98 | 3.68 | 10.31 | — | — | — | — |
| Trans-linalol 3,6-oxide (*) | — | 21.22 | — | — | 10.11 | 110.38 | 120.71 |
| Heptanol | — | 10.65 | 4.68 | — | — | 34.20 | 33.50 |
| 6-Methyl-5-hepten-2-ol | — | 4.31 | 8.23 | — | — | 51.34 | 52.53 |
| Trans, cis-2,4-heptadienal | 100.83 | 10.85 | 21.79 | 30.84 | 38.51 | 24.95 | 19.48 |
| Cis-linalol 3,6-oxide (*) | — | 43.20 | 3.43 | — | 8.11 | 118.25 | 138.47 |
| 2-Ethylhexanol | 1.89 | 4.41 | 3.58 | 8.72 | 4.09 | 15.88 | 15.87 |
| Trans, trans-2,4-heptadienal | 183.19 | 12.23 | 86.38 | 42.75 | 53.51 | 85.71 | 80.56 |
| Cis, trans-3,5-octadien-2-one | 90.64 | 3.91 | 111.32 | 22.51 | 58.67 | 129.97 | 120.07 |
| Benzaldehyde | 15.42 | 34.45 | 359.34 | 34.45 | 36.70 | 150.38 | 145.47 |
| Linalol (*) | 19.04 | 224.25 | 79.35 | 36.69 | 45.14 | 777.80 | 838.56 |
| Octanol | 5.59 | 18.90 | 15.04 | 21.40 | 29.35 | 82.23 | 77.76 |
| Trans, trans-3,5-octadien-2-one | 21.19 | — | 42.31 | — | 7.82 | 41.97 | 41.92 |
| 6-Methyl-3,5-heptadien-2-one | 13.68 | — | 21.18 | — | — | 20.31 | 23.24 |
| Trans-2-octenol | — | — | — | — | — | 17.99 | 14.14 |
| Menthol | — | 3.58 | — | 14.62 | 18.61 | — | — |
| Nonanol | — | 34.94 | 8.24 | 15.76 | — | 68.13 | 66.89 |
| Neral | 5.12 | 27.03 | — | — | — | 5.85 | 9.10 |
| α-Terpineol | — | 19.56 | — | — | — | 18.76 | 23.78 |
| Geranial | 9.24 | 42.37 | 12.30 | — | 11.39 | 28.84 | 32.09 |
| Methyl salicylate (*) | 8.79 | 227.58 | 343.62 | 9.03 | 8.04 | 1702.45 | 1692.90 |
| Nerol | — | — | 6.59 | — | — | 99.10 | 96.87 |
| β-Damascone | — | — | 6.05 | 25.16 | — | 11.40 | 11.85 |
| Geraniol (*) | 7.01 | 377.64 | 60.24 | 124.80 | 74.38 | 629.29 | 656.64 |
| α-Ionone (*) | 26.83 | — | 63.44 | 12.44 | 11.47 | 63.33 | 61.67 |
| Neryl acetone | 22.99 | 16.71 | 65.71 | — | — | 76.13 | 83.65 |
| Benzyl alcohol | — | 28.53 | 214.85 | 44.16 | 25.38 | 156.74 | 159.36 |
| Phenethyl alcohol (*) | — | 19.37 | 37.66 | 10.70 | 53.19 | 190.09 | 197.10 |
| β-Ionone (*) | 73.30 | 8.01 | 165.93 | 39.08 | 8.00 | 165.27 | 165.51 |
| Cis-jasmone | 6.10 | 58.44 | 15.12 | 257.64 | 1373.12 | 18.27 | 35.34 |
| β-Ionone epoxide | 103.44 | — | 197.82 | 77.71 | 205.86 | 190.21 | 199.52 |
| Trans-nerolidol | 29.24 | 40.92 | 155.49 | 56.95 | 259.46 | 245.97 | 266.59 |
| Nonanoic acid | 9.47 | 17.83 | 18.40 | 82.19 | 111.22 | — | — |
| Decan-1,5-olide | — | — | — | 22.34 | 112.21 | — | — |

TABLE A-continued

| Compound | A | B | C | D | E | F | G |
|---|---|---|---|---|---|---|---|
| 7-Decen-1,5-olide | — | — | — | 115.88 | 679.56 | — | — |
| 2,4-Di-tert-butyl phenol | — | — | 14.73 | — | — | 17.83 | 17.59 |
| Trans-nerolidol-10,11-oxide | — | — | — | 152.21 | 86.84 | — | — |
| Methyl jasmonate (*) | — | — | — | 81.60 | 564.22 | — | — |
| Dihydroactinidiolide | — | — | — | 140.62 | 247.84 | — | — |
| Indole (*) | 26.29 | 53.78 | 37.14 | 634.04 | 802.74 | 31.25 | 51.78 |
| Sum of all components | 1067.76 | 1710.73 | 2674.61 | 2494.18 | 5277.18 | 6021.72 | 6198.54 |
| Sum of key components | 186.72 | 1180.86 | 980.33 | 1236.65 | 2980.77 | 4088.72 | 4252.67 |

(*): Key compounds: aroma compounds which are conventionally to be highly contributed to the tea aroma
A: low-grade tea leaf extract (comparative example)
B: 1% solution of fresh tea leaf powder (b) (comparative example)
C: extract of β-glucosidase-treated low-grade tea leaf (comparative example)
D: extract of high-grade tea leaf (Yame Okumidori) (referential example)
E: extract of high-grade tea leaf (Koshun) (referential example)
F: low-grade tea extract treated with fresh tea leaf powder (b) (example)
G: low-grade tea extract treated with fresh tea leaf powder (f) (example)

As FIGS. 1 and 2 clearly indicate, the content of the aroma compounds is increased by 2.5 times according to the treatment with β-glucosidase, with respect to the aroma compounds of the low-grade tea extract. This aroma compound content was almost comparable to the level (2.23 times) of the extract of a high-grade tea (Yame Okumidori) prepared from the same amount of tea leaves but could not attain the level (4.94 times) of the other extract of high-grade tea (Koshun). On the other hand, the content of the aroma compounds of the 1% aqueous solution of the fresh tea leaf powder is 2.16 times as large as that of the extract of low-grade tea. When the extract of low-grade tea is treated with the fresh tea leaf powders, the content of the aroma compounds is increased by 5.64 times and 5.81 times, respectively by the fresh tea leaf powders, i.e., exceeding the level of the extract of the high-grade tea (Koshun).

By comparing the ratio of key compounds to the whole aroma compounds, it is found that the key compounds amounted to 50 to 70% of the whole aroma compounds in the high-grade tea extracts while the key compounds amounted to about 18% of the whole compounds in the low-grade tea extract. Although the key compound ratio of the extract of low-grade tea leaf treated with β-glucosidase is 35%, it is still lower than that of the high-grade tea extracts. With regard to the samples treated with the fresh tea leaf powders, the key aroma compound ratio is about 70% in each case. Namely, the key aroma compounds are contained at a ratio comparable to the high-grade tea extracts or higher.

As shown in the above results, by treating a low-grade tea extract with a fresh tea leaf powder, the aroma compounds can be increased to a level comparable to that of the high-grade tea or higher in a well-balanced manner (close to the ratio in the high-grade tea).

(Treatment of Corn)

To 5 g of a corn powder, 50 ml of ion-exchanged water was added (manufactured by Knorr Foods Co., Ltd.). Further, 25 mg (0.05% by mass based on water) or 500 mg (1% by mass based on water) of the washed fresh tea leaf powder (w) according to the present invention was added and the resultant mixture was treated at 50° C. for 3 hours in a incubator and then heated to 80° C. for 10 minutes. After the completion of the treatment, it was quickly cooled to 50° C. to give a powder-treated corn soup according to the present invention.

For comparison, an enzyme-treated corn soup was obtained by the same preparation method as described above except adding 25 mg (0.05% by mass based on water) of β-glucosidase as a substitute for the washed fresh tea leaf powder (w) added in the above preparation method. Further, a comparative corn soup (corn extract) without treatment with the washed fresh tea leaf powder was obtained by the same preparation method as described above except adding no washed fresh tea leaf powder (w) in the above preparation method.

(Sensory Evaluation)

Each of the obtained corn soups was subjected to the sensory evaluation of flavor by five skilled panelists.

The results are shown in Table 10.

TABLE 10

Treatment of corn

| Washed fresh tea leaf powder | | |
|---|---|---|
| Type | Amount (based on water) | Comment |
| Untreated (comp. example) | — | Lowering in sweet smell and weakened aroma in total. |
| β-Glc (comp. example) | 0.05% | Lowering in sweet smell and emphasized roasted smell. |
| (w) (invention example) | 0.05% | Emphasized sweet and roasted smells. Enriched and full-bodied taste. |
| (w) (invention example) | 1% | Highly emphasized sweet and roasted smells. Further enriched taste. |

By treating with the washed fresh tea leaf powder (w) according to the present invention, the roasted smell as well as the sweet smell characteristic to corn were emphasized and, the total aroma was enriched.

(Treatment of Apple Juice)

Ion-exchanged water was added to a concentrated apple juice to achieve Brix 11. To 10 g of this apple juice, 5 mg (0.05% by mass based on the juice) or 100 mg (1% by mass based on the juice) of the washed fresh tea leaf powder (w) according to the present invention was added and the resultant mixture was treated at 25° C. for 6 hours in an incubator. Then it was filtered through a cloth to remove solid matters and heated to 80° C. for 10 minutes. After the completion of the treatment, it was quickly cooled to 25° C. to give a powder-treated apple juice.

For comparison, an enzyme-treated apple juice was obtained by the same preparation method as described above except adding 5 mg (0.05% by mass) of β-glucosidase as a substitute for the washed fresh tea leaf powder (w) added in the above preparation method. Further, an apple juice without treatment with the washed fresh tea leaf powder was obtained by the same preparation method as described above but adding no washed fresh tea leaf powder (w) in the above preparation method.

(Sensory Evaluation)

Each of the treated apple juices thus obtained was subjected to the sensory evaluation of flavor by five skilled panelists.

The results are shown in Table 11.

TABLE 11

Treatment of apple juice

Washed fresh tea leaf powder

| Type | Amount (based on juice) | Comment |
|---|---|---|
| Untreated (comp. example) | — | Weakened freshness and off-balance aroma in total. |
| β-Glc (comp. example) | 0.05% | Emphasized sweet and heavy smell and off-balance aroma in total |
| (w) (invention example) | 0.05% | Emphasized cider smell, green feel and sweet smell. Enriched and full-bodied taste. |
| (w) (invention example) | 1% | Highly emphasized cider smell, green feel and sweet smell. Further enriched taste. |

(Treatment of Grape Juice)

Each of treated grape juices were prepared by completely the same method as the above preparation method but using a concentrated grape juice as a substitute for the concentrated apple juice in the above preparation method.

(Sensory Evaluation)

Each of the treated grape juices thus obtained was subjected to the sensory evaluation of flavor by five skilled panelists.

The results are shown in Table 12.

TABLE 12

Treatment of grape juice

Washed fresh tea leaf powder

| Type | Amount (based on juice) | Comment |
|---|---|---|
| Untreated (comp. example) | — | Weakened freshness and off-balance aroma in total. |
| β-Glc (comp. example) | 0.05% | Emphasized sweet and heavy smell and off-balance aroma in total |

TABLE 12-continued

Treatment of grape juice

Washed fresh tea leaf powder

| Type | Amount (based on juice) | Comment |
|---|---|---|
| (w) (invention example) | 0.05% | Emphasized wine smell, green feel and sweet smell. Enriched and full-bodied taste. |
| (w) (invention example) | 1% | Highly emphasized wine smell, green feel and sweet smell. Further enriched taste. |

(Treatment of Orange Juice)

Each of treated orange juices were prepared by completely the same method as the above preparation method but using a concentrated orange juice as a substitute for the concentrated apple juice in the above preparation method.

(Sensory Evaluation)

Each of the treated orange juices thus obtained was subjected to the sensory evaluation of flavor by five skilled panelists.

The results are shown in Table 13.

TABLE 13

Treatment of orange juice

Washed fresh tea leaf powder

| Type | Amount (based on juice) | Comment |
|---|---|---|
| Untreated (comp. example) | — | Weakened freshness and off-balance aroma in total. |
| β-Glc (comp. example) | 0.05% | Emphasized sweet and heavy smell and off-balance aroma in total |
| (w) (invention example) | 0.05% | Emphasized green feel and sweet smell. Enriched and full-bodied taste. |
| (w) (invention example) | 1% | Highly emphasized green feel and sweet smell. Further enriched taste. |

(Treatment of Flower)

A 0.1% aqueous solution of the washed fresh tea leaf powder (w) of Example 1 was uniformly sprayed onto fresh picked rose (variety: Cocktail) flowers and buds. After allowing to stand under shade conditions at 25° for 9 hours, the flowers and buds were extracted by the solvent extraction method using petroleum ether to give an aroma compound extract.

On the other hand, a control aroma compound extract was obtained by the same method as described above except spraying water as a substitute for the 0.1% aqueous solution of the fresh tea leaf powder (w) of Example 1.

Smelling test paper sheets were impregnated respectively with these extracts and the aroma intensities were compared. As a result, the washed fresh tea leaf powder-treated aroma extract gave a well-balanced and remarkably enriched aroma characteristic to rose in comparison with the aroma of the water-treated aroma extract.

INDUSTRIAL APPLICABILITY

According to the present invention, fresh tea leaf powder having an excellent taste and giving a rich aroma can be obtained. It is also possible to provide processed and treated tea leaves, treated vegetables, treated fruits or treated flowers, tea extracts, vegetable extracts, fruit extracts (fruit juice) or flower extracts (oil) by treating low-grade tea leaves, tea extracts or tea slurry of non fermented, semi fermented and fully fermented tea such as green tea, black tea and Oolong tea; vegetables; fruits or a flowers, or extracts or slurry thereof with the fresh tea leaf powder according to the present invention having an excellent taste and giving a rich aroma, so as to impart an excellent taste thereto and enrich the aroma of the material such as tea, vegetables, fruits or flowers to be treated in a well-balanced manner. Furthermore, aroma of the materials to be treated such as tea, vegetables, fruits or flowers can be obtained by subjecting such extracts to the process of collecting aroma typified by the SCC method. Moreover, food and drink or cosmetics having well-balanced and enriched aroma can be obtained by adding such extracts or aroma obtained from the extracts by the process of collecting aroma.

The invention claimed is:

1. Tea aroma, vegetable aroma, fruit aroma, or flower aroma, which is obtained from an extract or a slurry of a tea, a vegetable, a fruit, or a flower, said extract or slurry of the tea, vegetable, fruit or flower being treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher.

2. Tea aroma, vegetable aroma, fruit aroma, or flower aroma, which is obtained from an extract or a slurry of a tea, a vegetable, a fruit, or a flower, said extract or slurry of the tea, vegetable, fruit or flower being treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher.

3. Tea aroma, vegetable aroma, fruit aroma, or flower aroma, which is obtained from an extract or a slurry of a tea, a vegetable, a fruit, or a flower, said extract or slurry of the tea, vegetable, fruit or flower being treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher, followed by washing the resulting powder with acetone or ethanol.

4. Tea aroma, vegetable aroma, fruit aroma, or flower aroma, which is obtained from an extract or a slurry of a tea leaf, a vegetable, a fruit, or a flower, wherein the extract or slurry is obtained from a tea leaf, a vegetable, a fruit, or a flower that is treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same; and wherein the treatment of the tea leaf, vegetable, fruit or flower with the fresh *Camellia sinensis* tea leaf powder is conducted by contacting the tea leaf, vegetable, fruit or flower with the fresh *Camellia sinensis* tea leaf powder for 0.5 to 72 hours at a temperature of from 4° C. to 65° C., followed by a heat treatment.

5. Tea aroma, vegetable aroma, fruit aroma, or flower aroma, which is obtained from an extract or a slurry of a tea leaf, a vegetable, a fruit, or a flower, wherein the extract or slurry is obtained from a tea leaf, a vegetable, a fruit, or a flower that is treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same; and wherein the treatment of the tea leaf, vegetable, fruit or flower with the fresh *Camellia sinensis* tea leaf powder is conducted by contacting the tea leaf, vegetable, fruit or flower with the fresh *Camellia sinensis* tea leaf powder for 0.5 to 72 hours at a temperature of from 4° C. to 65° C., followed by a heat treatment.

6. Tea aroma, vegetable aroma, fruit aroma, or flower aroma, which is obtained from an extract or a slurry of a tea leaf, a vegetable, a fruit, or a flower, wherein the extract or slurry is obtained from a tea leaf, a vegetable, a fruit, or a flower that is treated with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same; and wherein the treatment of the tea leaf, vegetable, fruit or flower with the fresh *Camellia sinensis* tea leaf powder is conducted by contacting the tea leaf, vegetable, fruit or flower with the fresh *Camellia sinensis* tea leaf powder for 0.5 to 72 hours at a temperature of from 4° C. to 65° C., followed by a heat treatment, followed by washing the resulting powder with acetone or ethanol.

7. A tea extract, a vegetable extract, a fruit extract or a flower extract, which is obtained by treating an extract or a slurry of a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher.

8. A tea extract, a vegetable extract, a fruit extract or a flower extract, which is obtained by treating an extract or a slurry of a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher.

9. A tea extract, a vegetable extract, a fruit extract or a flower extract, which is obtained by treating an extract or a slurry of a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the extract or the slurry of the tea, vegetable, fruit, or flower with the fresh *Camellia sinensis* tea leaf powder is conducted by contacting the extract or the slurry with the fresh *Camellia sinensis* tea leaf powder for 0.5 to 48 hours at a temperature of from 4° C. to 65° C., followed by a heat treatment at a temperature of 80° C. or higher, followed by washing the resulting powder with acetone or ethanol.

10. A tea extract, a vegetable extract, a fruit extract or a flower extract, which is obtained by treating a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the tea, vegetable, fruit, or flower with the fresh *Camellia sinensis* tea leaf powder is conducted by contacting the tea, vegetable, fruit, or flower with the fresh *Camellia sinensis* tea leaf powder for 0.5 to 48 hours at a temperature of from 4° C. to 65° C., followed by a heat treatment at a temperature of 80° C. or higher.

11. A tea extract, a vegetable extract, a fruit extract or a flower extract, which is obtained by treating a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis,* physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the tea, vegetable, fruit, or flower with the fresh *Camellia sinensis* tea leaf powder is conducted by contacting the tea, vegetable, fruit, or flower with the fresh *Camellia sinensis* tea leaf powder for 0.5 to 48 hours at a temperature of from 4° C. to 65° C., followed by a heat treatment at a temperature of 80° C. or higher.

12. A tea extract, a vegetable extract, a fruit extract or a flower extract, which is obtained by treating a tea, a vegetable, a fruit, or a flower with a fresh *Camellia sinensis* tea leaf powder, said fresh *Camellia sinensis* tea leaf powder comprising β-glucosidase, polyphenol oxidase, and lipoxygenase, wherein the fresh *Camellia sinensis* tea leaf powder is obtained by collecting a fresh leaf and/or a stem of a first harvested tea and/or second harvested tea of a tea plant *Camellia sinensis*, physically damaging the fresh tea leaf, keeping the fresh tea leaf under shade conditions after collecting, allowing the fresh tea leaf to stand for 30 minutes to 72 hours, freeze-drying and subsequently milling the same, and wherein the treatment of the tea, vegetable, fruit, or flower with the fresh *Camellia sinensis* tea leaf powder is conducted by contacting the tea, vegetable, fruit, or flower with the fresh *Camellia sinensis* tea leaf powder for 0.5 to 48 hours at a temperature of from 4° C. to 65° C., followed by a heat treatment at a temperature of 80° C. or higher, followed by washing the resulting powder with acetone or ethanol.

13. Food or drink comprising the tea aroma, the vegetable aroma, the fruit aroma or the flower aroma as claimed in any one of claims 1 to 6.

14. A cosmetic comprising the vegetable aroma, the fruit aroma or the flower aroma as claimed in any one of claims 1 to 6.

15. Food or drink comprising the tea extract, the vegetable extract, the fruit extract or the flower extract as claimed in any one of claims 7 to 12.

16. A cosmetic comprising the vegetable extract, the fruit extract or the flower extract as claimed in any one of claims 7 to 12.

* * * * *